(12) United States Patent
Washington et al.

(10) Patent No.: US 10,664,808 B2
(45) Date of Patent: May 26, 2020

(54) SYSTEM AND METHOD FOR MANAGING ON-DEMAND TEST DRIVES

(71) Applicant: Shift Technologies, Inc., San Francisco, CA (US)

(72) Inventors: Joel Washington, San Francisco, CA (US); Irakly George Arison Areshidze, San Francisco, CA (US); Tobias Russell, Alexandria, VA (US); Minneola Ingersoll, San Francisco, CA (US); Christian Michael Ohler, San Francisco, CA (US); Hanna Klots Benbarak, San Francisco, CA (US); Michal Sobieski, Palo Alto, CA (US); Alejandro Cesar Ayestaran, San Francisco, CA (US); Pablo Ignacio Diaz Rozic, San Francisco, CA (US); Craig John Isakow, Oakland, CA (US); Yu Fei Liu, San Francisco, CA (US); Alexander Scott Paul, San Francisco, CA (US); Jonathan Alex Gold, San Mateo, CA (US); Saud Khan, Castro Valley, CA (US); Jonathan Vincent, San Francisco, CA (US)

(73) Assignee: Shift Technologies, Inc., San Francisco, CA (US)

( * ) Notice: Subject to any disclaimer, the term of this patent is extended or adjusted under 35 U.S.C. 154(b) by 463 days.

(21) Appl. No.: 15/379,357

(22) Filed: Dec. 14, 2016

(65) Prior Publication Data

US 2017/0169398 A1 Jun. 15, 2017

Related U.S. Application Data

(60) Provisional application No. 62/267,024, filed on Dec. 14, 2015.

(51) Int. Cl.
*G06Q 10/10* (2012.01)
*G06Q 10/08* (2012.01)

(52) U.S. Cl.
CPC ........ *G06Q 10/1095* (2013.01); *G06Q 10/08* (2013.01)

(58) Field of Classification Search
None
See application file for complete search history.

(56) References Cited

U.S. PATENT DOCUMENTS 7,433,836 B1 * 10/2008 August .............. G06Q 10/10
705/30
9,165,319 B1 * 10/2015 Henry .............. G06Q 30/0623
(Continued)

*Primary Examiner* — Eric W Stamber
*Assistant Examiner* — Alan Torrico-Lopez
(74) *Attorney, Agent, or Firm* — Alpine Patents LLC; Brian Van Osdol

(57) ABSTRACT

A system and method for on demand test drives that can include managing a set of vehicle and worker resources in a resource management system; monitoring user browsing patterns of a customer on an online vehicle marketplace; receiving a test drive request from the customer, the request specifying a requested vehicle and test drive location; retrieving test drive availability options from the resource management system; setting a test drive appointment for a selected test drive availability option; coordinating worker and vehicle transport to a scheduled location of the test drive appointment; and delivering vehicle information during the test drive appointment.

16 Claims, 11 Drawing Sheets

(56) References Cited

U.S. PATENT DOCUMENTS

| | | | |
|---|---|---|---|
| 10,127,596 B1* | 11/2018 | Franke | G06Q 30/0631 |
| 2003/0130966 A1 | 7/2003 | Thompson et al. | |
| 2005/0222879 A1* | 10/2005 | Dumas | G06Q 10/00 |
| | | | 705/5 |
| 2010/0223158 A1* | 9/2010 | Brown | G06Q 10/04 |
| | | | 705/26.1 |
| 2011/0054823 A1* | 3/2011 | Long | G05B 23/0256 |
| | | | 702/108 |
| 2011/0099036 A1* | 4/2011 | Sarkissian | G06Q 10/02 |
| | | | 705/5 |
| 2011/0196800 A1 | 8/2011 | Sachire et al. | |
| 2012/0005108 A1 | 1/2012 | Hollenshead et al. | |
| 2014/0344014 A1* | 11/2014 | MacInnis | G06Q 30/0201 |
| | | | 705/7.29 |
| 2015/0356672 A1 | 12/2015 | Humble et al. | |
| 2016/0071054 A1 | 3/2016 | Kakarala et al. | |
| 2016/0162478 A1* | 6/2016 | Blassin | G06Q 10/06311 |
| | | | 706/12 |
| 2016/0162817 A1 | 6/2016 | Grimaldi et al. | |
| 2016/0253706 A1* | 9/2016 | Kursar | G06Q 30/0261 |
| | | | 705/14.58 |
| 2016/0307174 A1* | 10/2016 | Marcelle | G06Q 40/025 |
| 2017/0061529 A1 | 3/2017 | Sweeder et al. | |
| 2017/0140452 A1* | 5/2017 | Li | G06Q 30/0623 |

* cited by examiner

SYSTEM AND METHOD FOR MANAGING ON-DEMAND TEST DRIVES

CROSS-REFERENCE TO RELATED APPLICATIONS

This Application claims the benefit of U.S. Provisional Application No. 62/267,024, filed on 14 Dec. 2015, which is incorporated in its entirety by this reference.

TECHNICAL FIELD

This invention relates generally to the field of automobile test-driving, and more specifically to a new and useful system and method for managing on-demand test drives.

BACKGROUND

There are several online used-car marketplaces where users can browse and buy cars. However, one crucial element of buying a car is test-driving the car. Test drives are usually conducted at a car lot or coordinated with an owner of a car. As a first problem, test drives are completed while sitting next to a salesman that is paid on commission. As a second problem, the user must find time to go visit the car dealership, which is inconvenient. Thus, there is a need in the automobile test-driving field to create a new and useful system and method for managing on-demand test drives. This invention provides such a new and useful system and method.

DESCRIPTION OF THE EMBODIMENTS

The following description of the embodiments of the invention is not intended to limit the invention to these embodiments but rather to enable a person skilled in the art to make and use this invention.

1. Overview

Figure 1:
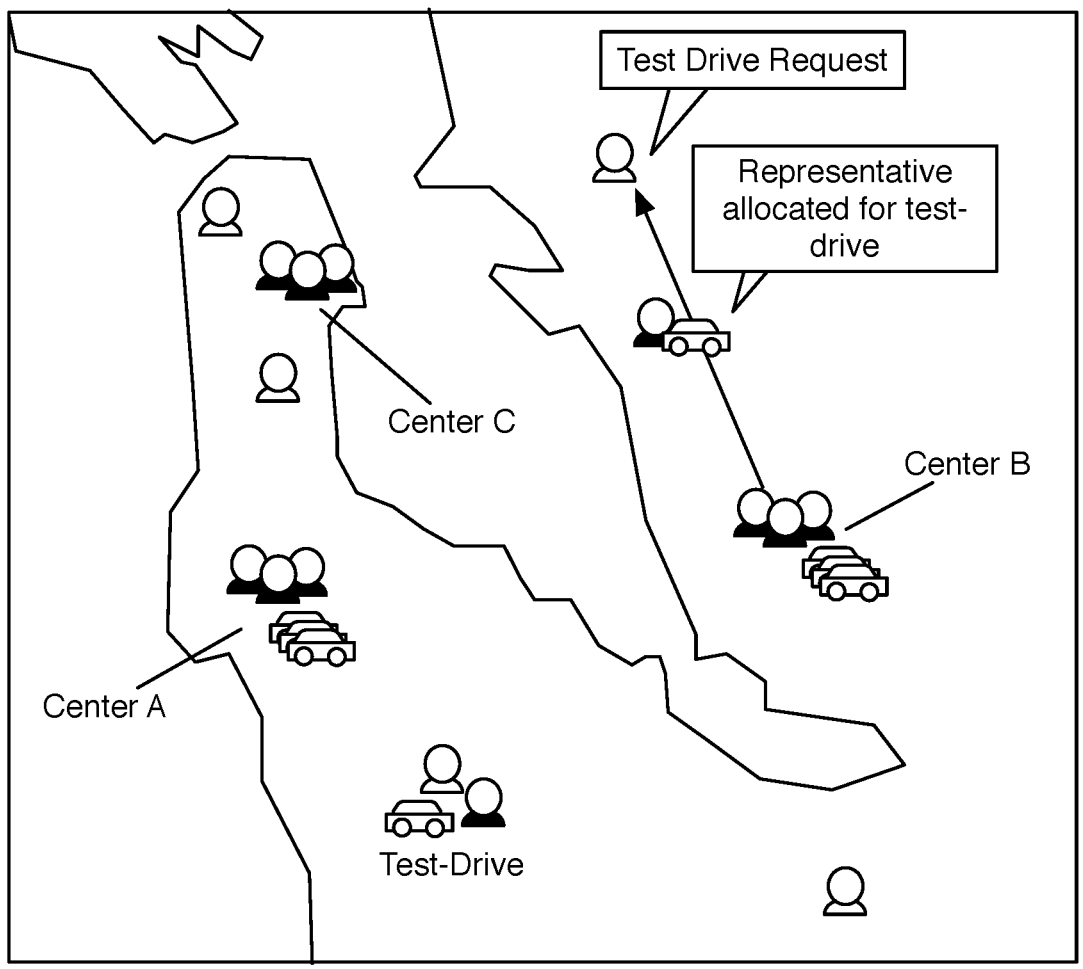
FIG. 1 is a schematic illustration of the distributed resources of a system in use.

A system and method for managing on-demand test drives function to offer an improved user experience where a user can test drive at a time and location of his or her choosing. The system and method are preferably implemented to facilitate operating a vehicle marketplace that allows test drives but without mandating that a customer visit one particular location. The system and method can enable a distributed vehicle marketplace that can operate independently of a centralized car lot. The method further functions to provide automated operational management of merchant resources when fulfilling test drive requests as shown in FIG. 1. The method can further provide automated application interactions that function to improve the test-driving experience. The system and method are preferably applied to the use-case of the sale and purchase of used or new cars, but the system and method can be used in selling, leasing, or renting new or used motorcycles, RVs, trailers, boats, planes, construction equipment, and/or any suitable type of vehicle. The system and method can be used in offering a test drive to a potential customer, but the system and method could similarly be used in managing resources for the vehicle marketplace acquiring vehicles or providing quotes for vehicles. Additionally, one skilled in the art would appreciate that aspects of the system and method may additionally be applied to other forms of marketplaces benefiting from on-demand trials, but herein used-car transactions will be used as the primary example.

One particular challenge addressed by the system and method is that of single object delivery (e.g., delivering a car for a test drive). The resources involved in selling a used-car can have several constraining factors: there is often only one instance of a particular car; at least one representative is included in the test drive; a representative's time is consumed during transport to the user, the vehicle showing, and the return from the user location; only one car can be easily delivered by a person at a time; and a car marketplace may serve a large geographical area. In one variation, the system and method can additionally account for providing representatives trained for particular types of vehicles. Ensuring that trained representative fulfill particular test drives can add further logistical challenges addressed by the system and method.

Figure 2:
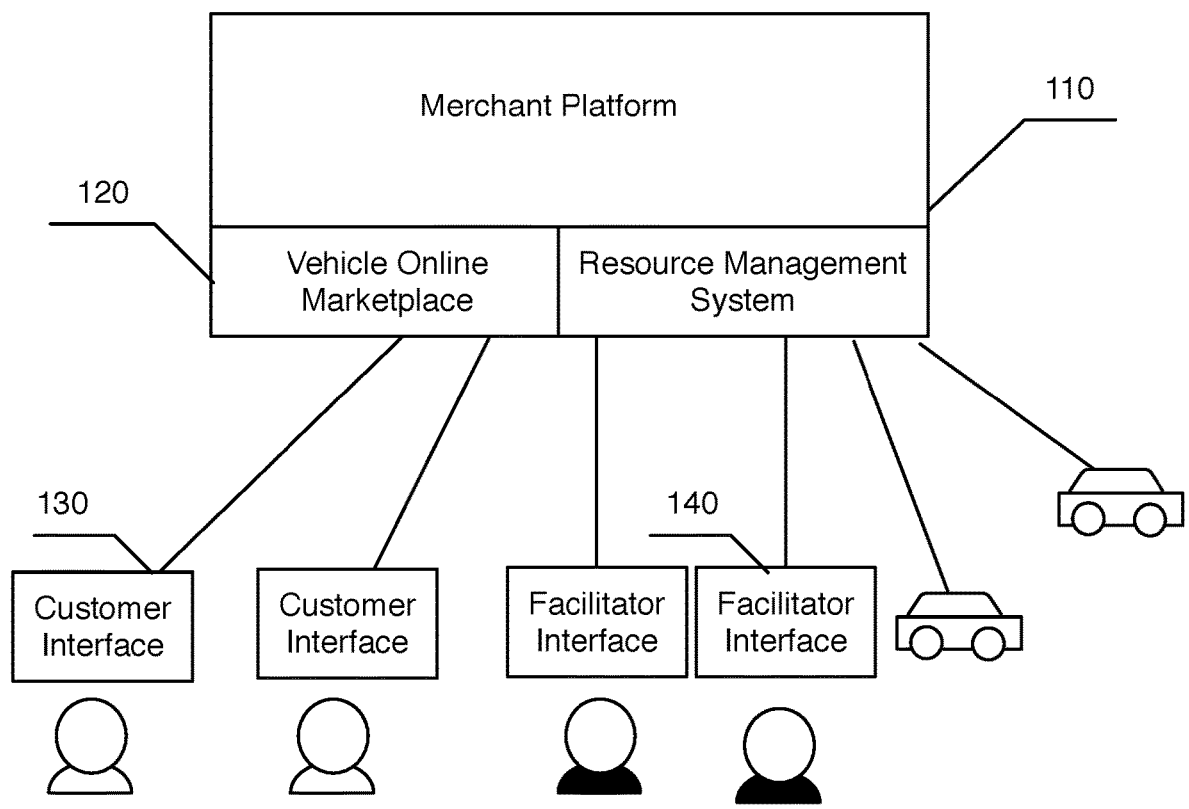
FIG. 2 is a schematic representation of a system of a preferred embodiment.

A system for managing on-demand test drives preferably includes a resource management system 110, an online marketplace 120, a customer interface 130, and facilitator interface 140 (used by company representatives, salespeople, or others involved in administrating the test drive) as shown in FIG. 2. The system is preferably implemented through an online merchant platform that is in communication with multiple user interface instances. The merchant platform can be hosted in a remote cloud computing system, but can alternatively be hosted on any suitable computing infrastructure. The user interfaces instances, such as the customer interface 130 and the facilitator interface 140, can be a native application, a web-based application, or any suitable type of user interface. In some variations, notifications and interaction may be facilitated through existing communication channels such as email, SMS/MMS, messaging applications, social media communications, or any suitable form of communication.

The resource management system 110 functions as a computing system for orchestrating resources used in the operation of the vehicle marketplace. The merchant platform preferably includes an operational controller, which includes business logic to manage and direct test drive requests, facilitator instructions, inventory transport, and/or other suitable aspects relating to fulfilling test drive requests. The operational controller generates test drive notifications that can provide instructions for representatives and/or vehicle sites. The test drive notifications are preferably generated in response to a test drive request received from a potential customer. In one variation, the operational controller can include automatic resource management functionality, which can initiate instructions and resource allocation directives in response to predicted demand. The merchant platform can additionally host the resources to support a car marketplace including car information and media, which can be served to a customer interface 130.

The online marketplace 120 functions as a portal for browsing and exploring vehicles offered through the vehicle marketplace. The online marketplace 120 is preferably accessible through a website and/or application interface. The online marketplace 120 can enable searching for vehicles, saving/bookmarking vehicles, inspecting vehicle details, comparing vehicles, and/or other suitable features.

The online marketplace 120 preferably includes a customer interface 130 through which the customer can browse automobile options, request a test drive, receive updates, reschedule a test drive, change test drive time and location, cancel a test drive, and/or interact with the car merchant in any suitable manner. In one variation, there can be multiple customer interface types. There may be a website for browsing vehicles and a native application interface to interact with the customer during a test drive. In one exemplary implementation, a customer will browse used cars and initiate a test drive request through a website. Notifications about the test drive, such as expected arrival of the car, may be delivered over SMS/MMS or other communication channels.

The facilitator interface 140 functions to provide an interface used by a representative or other workers of the marketplace. A representative as used herein characterizes a worker that will interact with a customer during the test drive. A worker could employed, a contractor, a volunteer, or any suitable class of worker that completes a task. A representative is preferably notified of a test drive request with details such as time, location, customer details, car, and/or other instructional information. The facilitator interface 140 can additionally provide notifications and information to help the representative provide a better test drive experience. Car information that is relevant to the customer can be highlighted and delivered to the representative in a context aware manner. Context aware information can be delivered through the facilitator app during a preparation stage, an in-person walk through stage, a test drive driving stage, a sale/discussion stage, and/or any suitable stage. A preparation stage can be defined as the time window prior to the vehicle being at the site for the test drive. The preparation stage can include the time as a representative is preparing to leave with the vehicle and/or when a representative is transporting to the test drive location. Transporting to the test drive location may include driving a car to the location of the customer or using alternative means of transportation to arrive at the location (e.g., with the vehicle being transported through another means). The facilitator interface 140 can present information about the customer and the vehicle to prep the representative. Such information can include comparable vehicles, vehicle features of interest to the customer, other vehicles the customer is considering, financing information, and/or any suitable information. A walk through stage can be information prompts when the representative is giving an overview of the vehicle and its features. At this point the representative may be walking around the car, inspecting various aspects, or sitting in the parked car. The driving stage is when the customer and representative are driving together in the car. The facilitator interface 140 can display route information, car information prompts, and other information useful during the driving stage. Such information may additionally or alternatively be exposed within the customer interface 130. The sale-stage can include various information and tools to complete the financing and sale of the car.

2. Method for Managing on-Demand Test Drives

Figure 3:
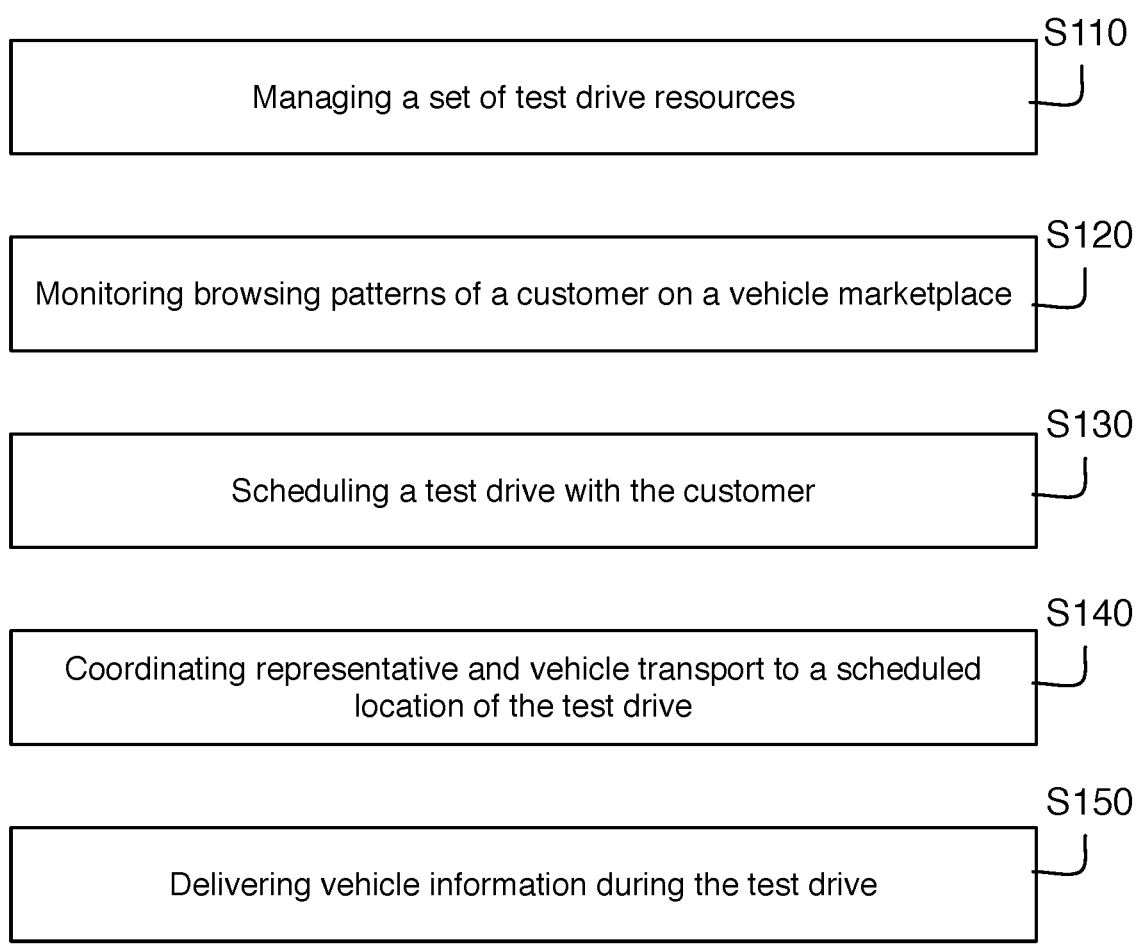
FIG. 3 is a block diagram of a method of a preferred embodiment.

A method for managing on-demand test drives of a preferred embodiment can include three stages when fulfilling a test drive: an initialization stage, a resource management stage, and a test drive experience stage. As shown in FIG. 3, the method preferably utilizes a resource management system in combination with a vehicle marketplace in coordinating and conducting a test drive. The method can provide automation of operational approaches that may facilitate running an on-line and distributed vehicle marketplace. The method preferably includes managing a set of test drive resources S110, monitoring browsing patterns on a vehicle marketplace S120, scheduling a test drive with the customer S130, coordinating representative and vehicle transport to a scheduled location of the test drive S140; and delivering vehicle information during the test drive S150.

The initialization stage is preferably comprised of blocks S110 and S120, which can occur in preparation for a initiating a test drive. The resource management stage is preferably comprised of blocks S130 and S140, which facilitates the coordination of resource using resource constraints and marketplace data-driven factors. The test drive experience primarily comprises block S150, which relates to representative and customer interactions during a test drive. The method can include additional and alternative processes within each of these stages. Similarly, the order and stage of a process may be modified, and a process may not be limited to only one stage. One skilled in the art would appreciate that the method may be implemented with any suitable combination of the described processes.

As a first objective, the method functions to enable on-demand test-driving of a vehicle at a time and location convenient to a user. A user can be alleviated of the inconvenience of arranging a time to visit the location of a used-car to take a test drive. As a second objective, the method functions to improve logistics of a vehicle marketplace providing on-demand test drives. As discussed above, providing an on-demand test drive service requires the organization of multiple human and physical resources. The method can function to coordinate such resources. Furthermore, vehicles are a limited and valuable resource, and the method may be orchestrated to drive higher efficiency of selling vehicles. As a third objective, the method functions to enhance the capabilities of a representative to provide good customer service to a customer during the test drive. Herein, the identifier of customer and more specifically a potential customer is used as the identifier of the entity interested in purchasing or otherwise trying a vehicle—the customer may or may not commit to a final purchase.

The method is preferably implemented through a system including a resource management system, merchant platform, an online marketplace, a customer interface, and a facilitator interface such as the one described above. The method may alternatively be implemented through any suitable system.

Block S110, which includes managing a set of test drive resources, functions to track and/or direct vehicle inventory and workers. The test drive resources are preferably managed so as to increase efficiency of conducting test drives and selling of vehicles.

A vehicle merchant executing the method can have several distributed resources that can be used to serve different test drive requests. Resources include vehicles and worker/personnel resources. Worker resources can include representatives (e.g., car enthusiasts that show the car to a customer), mechanics, vehicle-prep personnel, internal delivery drivers, and/or any suitable roles. In one variation, the vehicle merchant can include one resource site. A resource site preferably acts as at least a vehicle storage facility, but can additionally or alternatively act as a worker station. For example, a single site can house vehicles and be the base location for workers. More preferably, the vehicle merchant can include multiple resource sites distributed in geographically distinct locations as shown in FIG. 1. The set of resource sites can have various resource capacities. For example a first resource site in an urban area may have high representative capacity and lower vehicle storage capacity, and a second resource site in a rural area may have high vehicle storage capacity and be allocated multiple vehicle delivery drivers.

The vehicles as described above are preferably automobiles. Herein, used-cars are used as a primary example of a vehicle, but any suitable vehicle type may be used. Used-vehicles or other types of highly customized or individual items can have the particular challenge in that the product is generally not interchangeable with another product when being used in a test drive. A customer will generally want to test drive the exact car they are considering before purchasing. In the case where the vehicle is a new vehicle, a particular vehicle option may be interchangeable with other similar vehicles. For example, a customer may be satisfied in test driving a new vehicle of a different color, model, and mileage before ordering a selected version of the vehicle. The resource management system can preferably account for such interchangeability. In one variation, vehicles may be distributed and managed such that interchangeable vehicles are diversified across multiple storage facilities.

Test drive resources can additionally include vehicle storage facilities. A vehicle storage facility can be a parking lot, a warehouse, a car lot, a garage, street parking, and/or other facilities used to store a vehicle. Vehicles are preferably directed to be stored in various vehicle storage facilities based on demand. For example, one type of vehicle may be stored in a first storage facility near higher population of past customers of the first type of vehicle (e.g., people who purchased a vehicle and/or test-drove a vehicle), while a second type of vehicle may be stored in a second storage facility near a higher population of past customers of the second type of vehicle.

Managing the test drive resources preferably includes managing location, availability, and/or other scheduling aspects of the test drive resources. Managing of test drive resources preferably utilizes metrics based on test drive requests, which can reflect current or future demands. Managing of test drive resources can additionally predict test drive demand based on historical trends, browsing pattern data, and/or any suitable data source.

In one variation, the block S110 can include augmenting worker supply, which functions to increase or decrease the number of workers. Augmenting worker supply can including managing the current supply of workers through schedule adjustment, incentive adjustments, and the like. Incentive adjustments may include changes in pay rate for test drives or other work, priority for different tasks, or any suitable type of incentive. Worker supplies can be augmented based on demands and more specifically regional demands. Reports could be generated indicating schedule- and location-based demand for workers to fulfill test drive requests. Augmenting worker supply could additionally or alternatively include initiating automated recruitment tasks. For example, a job listing for a particular region, availability, and/or skillsets could automatically be distributed. Additionally particular types of workers may be targeted during recruitment. In one variation augmenting worker supply can additionally relate to augmenting a specific type of worker supply by automatically initiating training of a worker. As one variation of augmenting worker supply, training opportunities and/or tasks may be automatically distributed to qualified workers to increase the skills of a worker supply so as to satisfy a demand.

Augmenting worker supply and/or more generally managing resources can additionally factor in compensation and work scheduling for personnel resources. Test drives may experience higher demand on weekends and holidays and lower demand in the middle of the week. Demand can additionally be differ based on location. Compensation incentives can be automatically generated and used to encourage flexible work personnel to work at high demand times. Similarly, user feedback and reviews for test drive experiences can be used to reward representatives. User feedback may be used in determining recruitment and management of work force.

Figure 4:
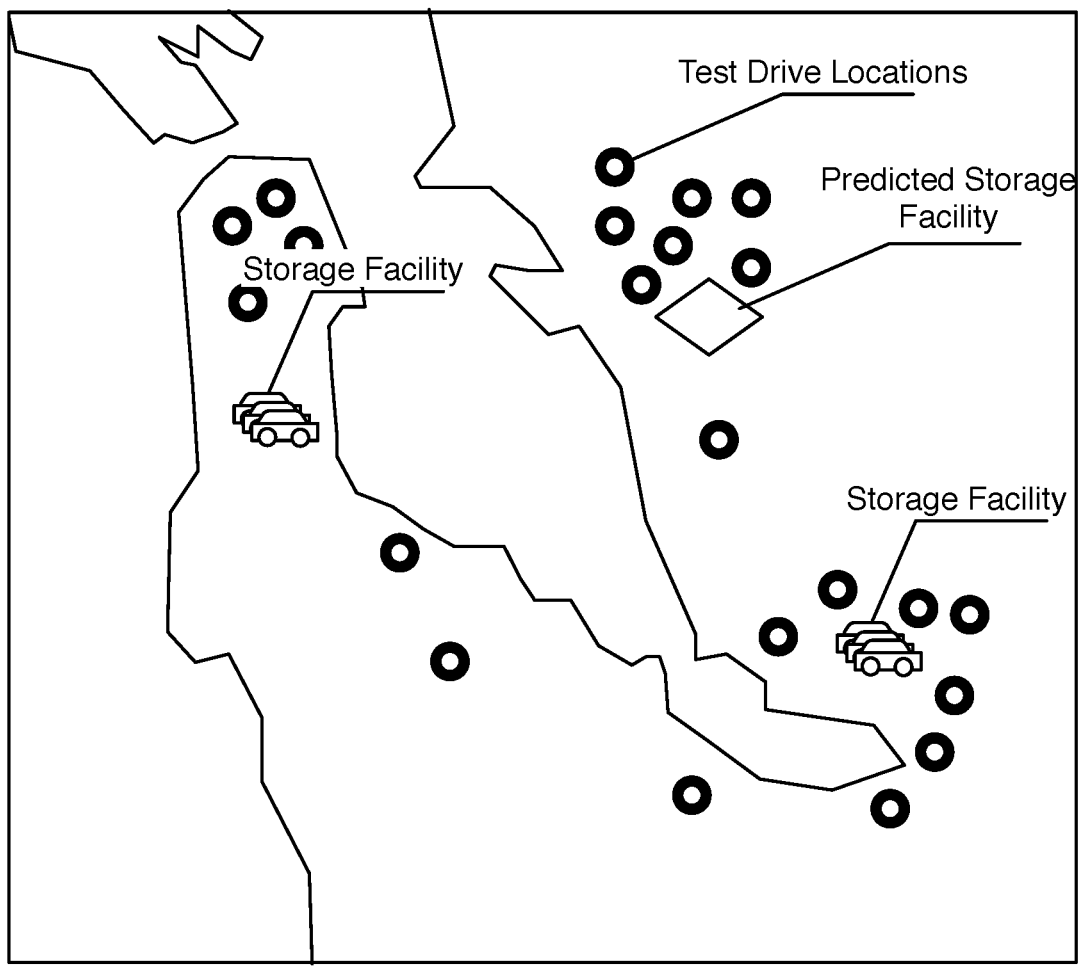
FIG. 4 is a schematic representation of identifying new storage facility regions.

In one variation, the block S110 can include identifying new storage facility regions as shown in FIG. 4. The browsing patterns of block S120, vehicle sales, scheduled test drives, and/or other factors can be used in determining where and when a new storage facility should be opened. Identification of a new storage facility may be generated in a report delivered to an administrator of the marketplace platform. Storage facilities can similarly be decommissioned when their storage capacity is not needed.

Figure 5:
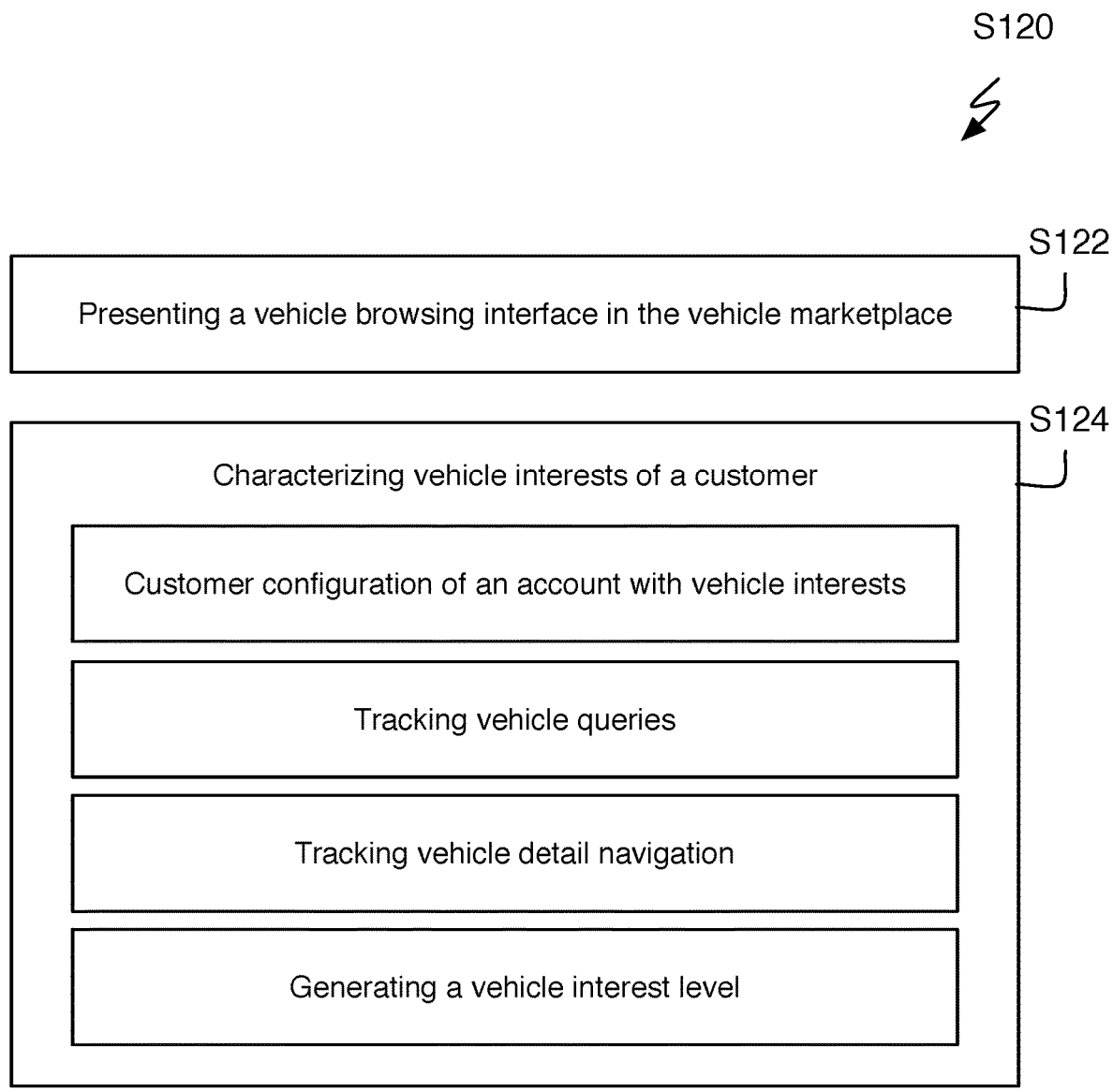
FIG. 5 is a schematic representation of monitoring browsing patterns of a customer.

Block S120, which includes monitoring browsing patterns on a vehicle marketplace, functions to build a model of user interests while enabling a customer to browse available vehicles and request a test drive. Monitoring browsing patterns can include characterizing browsing patterns of an individual customer, which functions to understand the specific vehicle interests of a customer. Monitoring browsing patterns may alternatively or additionally include characterizing browsing patterns of multiple users of the vehicle marketplace, which functions to build expectations of general users or types of users. In this variation, the browsing patterns of multiple users are monitored and then transformed into a representative model of user browsing patterns for all users or subsets of users. Herein, the approaches are described as being applied to monitoring an individual customer but the variations described herein can be applied to both approaches as can be appreciated by one skilled in the art. Monitoring browsing patterns preferably comprises presenting a vehicle browsing interface in the vehicle marketplace S122 and characterizing vehicle interests of a customer S124 as shown in FIG. 5. Blocks S122 and S124 are preferably used to classify and/or prioritize the various interests of a customer as it relates to one or more vehicles. Blocks S122 and S124 may additionally or alternatively be used in generating a vehicle interest level as a metric for the seriousness, perceived value, purchase probability, and/or suitable measure of customer priority. The browsing patterns can be used to characterize interactions with a website or an application, but can be more broadly applied to use of the platform which includes test drive history, vehicle purchase or selling history, or other suitable interactions with the vehicle marketplace.

Presenting a vehicle browsing interface S122 can enable a customer to visit a website and/or application and search, browse, and identity one or more vehicles of interest. Presenting a vehicle-browsing interface can include providing search tools. Search tools can include result filtering tools, vehicle comparison tools, a vehicle saving feature, and/or any suitable feature. Presenting a vehicle-browsing interface could additionally or alternatively include providing a vehicle gallery. Other formats of a vehicle marketplace could additionally be used.

Characterizing vehicle interest S124 functions to classify and/or quantify a customer's interest in one or more vehicles. A profile of vehicle interest can include a set of prioritized features and/or a vehicle interest level. Prioritized features are vehicle features that are expected to be more highly valued by a customer. For example, safety and backseat entertainment may be prioritized features by one customer purchasing a car for his or her family, and handling and horse power may be prioritized features by another customer. Vehicle interest level preferably quantifies how seriously a customer is considering a vehicle. Vehicle interest level in one variation can be characterized as a probability of a sale to a customer of a particular vehicle. The vehicle interest profile is preferably customized for a particular customer. Additionally or alternatively, a vehicle interest profile can be based on a subset of users. In one variation, the vehicle interest profile may indicate what a majority of customers are interested in for a particular car. For example, a vehicle interest profile for a hybrid may indicate that gas mileage and safety are important prioritized features while a SUV may have prioritized features such as 4WD and sports packages.

Vehicle interests can be associated with an account of the online marketplace. Accordingly, the method can include creating a user account and preconfiguring account information. The account can be a user account used in authentication but may alternatively be an account profile which may be based on application instance or browsing instance. Preconfiguring account information can include receiving vehicle interests of a customer, financing information, scheduling information, a set of possible test drive locations (e.g., home address, work address, gym address, etc.), and/or any suitable information. In some instances, a user can actively set vehicle interests. For example, a vehicle finding widget may collect information from a user on the list of features that are important in their vehicle purchasing decision.

Figure 6:
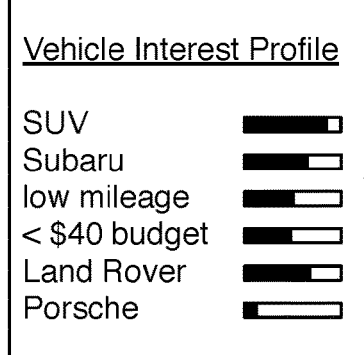
FIG. 6 is a schematic representation of generating a vehicle interest profile and vehicle interests.

Alternatively, the method can include collecting vehicle interests during use of the online marketplace, which functions to use behavioral analysis to characterize the vehicle interests of a customer. A vehicle interest profile is preferably generated as a customer navigates the marketplace as shown in FIG. 6. This may be done for a customer with or without an account. Collecting vehicle interests can include tracking: page or section views, user interface interactions (e.g., selecting view options), information display duration (e.g., how long the customer spent looking at different information), information interest (e.g., indicated by mouse hovering on information, expanding sections to read more detail, and the like), explicit customer actions (e.g., starring, bookmarking, and/or sharing), and/or other actions. The customer profile can be used in altering the test drive experience of Block S300 but can additionally be used in enhancing the browsing experience or any suitable aspect.

One variation may include tracking vehicle queries, which functions to translate search queries into vehicle interest information. Basic search queries such as the name or a vehicle class, brand, or model is preferably used to weight that particular vehicle interest. Filter options used to narrow vehicle queries can similarly be tracked and used in generating a vehicle interest profile. For example, a query may be made specifying "SUV" and then a user interface used to specify the query filters of 2014 or newer and 4WD. In another variation, changing the sort order of a query result may be used to set the prioritization of various properties. Ordering results by descending year can indicate the customer wants a newer car, and prioritizing results by ascending price can indicate the customer prioritizes a lower price.

In another variation, the navigation of the website and information can be interpreted into vehicle interest signals. Viewing pages, scrolling and viewing content, mouse interactions with content, selecting to see more information about a particular detail, and/or other information can be detected and used in building a vehicle interest profile from which prioritized features, vehicle interest levels, and/or other information can be extracted. In one instance, a vehicle detail view may include different sub-views detailing different types of information, and detecting navigation to different sub-views can be tracked and assessed as an indication of interest in the information related to that sub-view. For example, a vehicle detail page may include an engine information section, a safety information section, and an in-car entertainment package section. Navigating to one or more of those sections can be a signal of a customer's prioritization of those features and/or how serious they are considering the vehicle.

Some vehicle marketplaces (such as new vehicle marketplaces) may provide vehicle customization features such as options for color, packages, and/or add-ons. Selection of such customization options can update the vehicle interest profile of a customer. For example, while customizing a vehicle, the vehicle interest profile can be updated to indicate that the customer is interested in red and blue vehicles and 4 wheel drive.

In another instance, a vehicle marketplace can enable comparison of one or more vehicles. The vehicles included in a comparison and/or their order in a comparison may be used in updating a vehicle interest profile.

In another variation, the history of test drives (requested and/or scheduled), history of vehicle purchases, history of vehicle sales may be used in modifying the vehicle interest profile. For example, the list of vehicles previously owned by a customer can be used as a strong indicator of vehicle interests. Similarly, the vehicles scheduled for a test drive can be a strong indicator of vehicle interest.

Generating a vehicle interest level functions to produce a metric with which the interest in one vehicle can be compared to at least one other vehicle. As one exemplary approach, the set of vehicles browsed by the customer can be ordered according relative interest level. The interest level can be generated by comparing the feature interests of the customer to the features of the vehicle. The vehicle interest level of a vehicle is preferably increased directly related to the similarity of the set of features of the vehicle and the feature interests of the customer (e.g., greater similarity of a vehicle to prioritized features can result in a greater interest level). Similarly, the vehicle interest level of a vehicle is preferably inversely related to the set of discrepancies or differences of the set of features of the vehicle and the feature interests of the customer (e.g., interest level is decreased for a vehicle that has features that differ from the prioritized features of the customer). In one instance of such feature misalignment, the vehicle interest level is penalized when the vehicle is an outlier compared to other browsed vehicles. In some variations, a penalty for vehicle misalignment is applied when the vehicle is a higher value vehicle compared to majority of vehicles browsed by the customer as shown in FIG. 6. Such vehicle misalignment may mitigate the occurrence of a customer using the test drive to drive an expensive car with no intention of purchasing the car.

Figure 7:
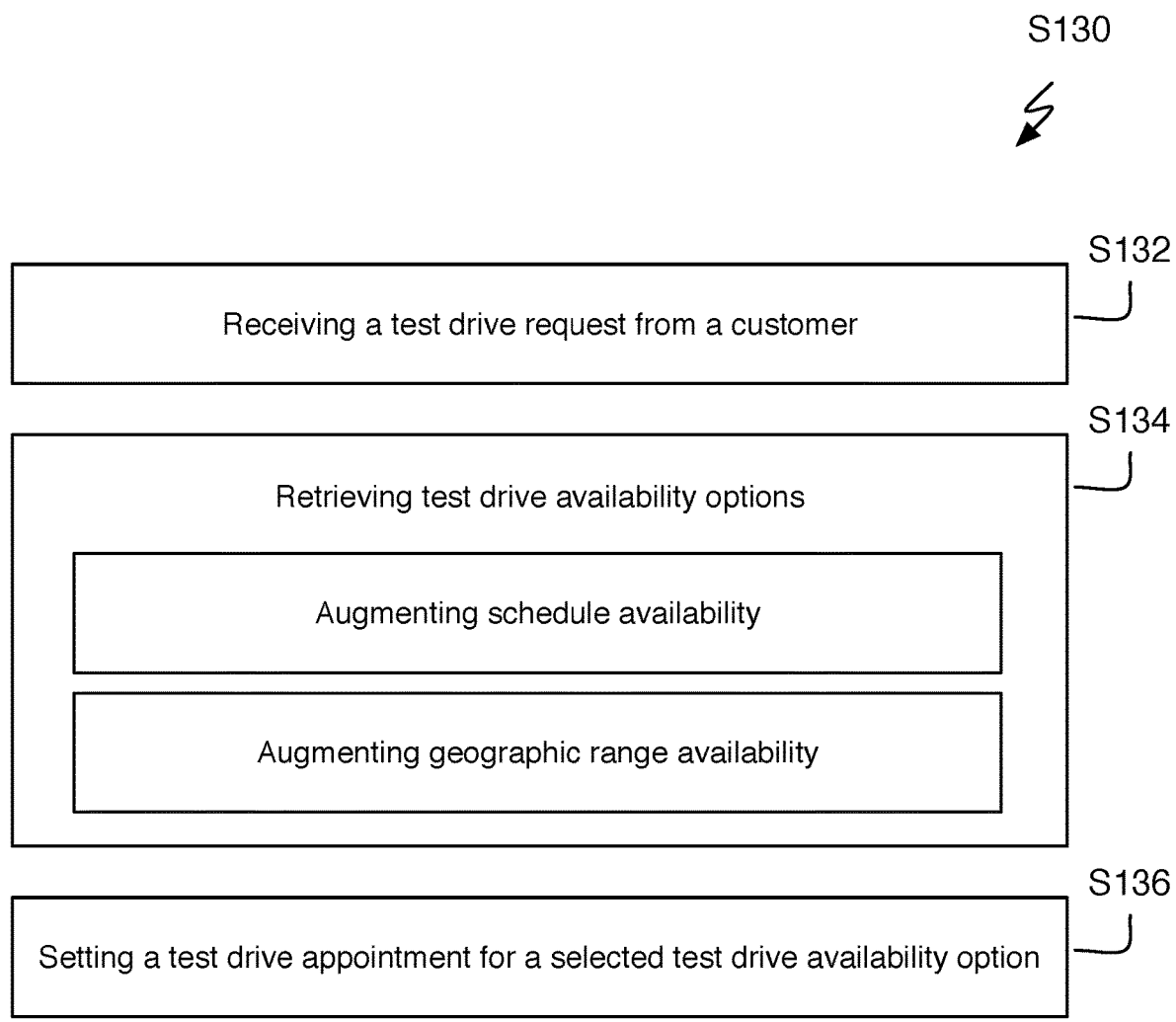
FIG. 7 is a detailed block diagram of scheduling a test drive with the customer.

Block S130, which includes scheduling a test drive with the customer functions to arrange a time and location for at least one representative to show a vehicle to a customer. The test drive is preferably scheduled at a location of the customers choosing such as at home or at work. A test drive is preferably scheduled through a test drive request interface of the vehicle marketplace. When presenting a vehicle browsing interface, a subset of vehicles can be marked as available for a test drive. Indicating test drive availability for a particular vehicle can be set based on the set of customer test drive locations, calendar of customer availability, and/or resource capacity as determined through resource management stage. For example, vehicles that are available to be shown to a customer can include a visual marker or have a test drive request button. In another variation, all vehicles can include a test drive request button. Presenting a test drive request interface preferably functions to initialize a test drive request and coordinate scheduling of the test drive. When initializing a test drive request, the customer interface preferably coordinates with the merchant platform in setting location and time of the test drive. Scheduling a test drive preferably comprises, receiving a test drive request from a customer S132, retrieving test drive availability options S134, and setting a test drive appointment for a selected test drive availability option S136 as shown in FIG. 7. In one variation, the scheduling can be substantially real-time where a user can see the availability of a vehicle for a test drive based on a test drive location. The available options are preferably calculated and supplied through the resource management processing stage. In another variation, the scheduling can be asynchronous wherein a customer supplies a set of time and location options, and then a response is delivered indicating the test drive details.

Block S132, which includes receiving a test drive request from a customer, functions to initiate scheduling of a test drive. An initial request preferably specifies a location set by the customer or associated with the customer and at least one vehicle. Additionally, a test drive may indicate timing preferences such as customer availability or preferences (e.g., weekends, mornings, afternoons, and the like). The communication flow of a request may be segmented into one or more communications. In a preferred implementation, a user specifies a location, and then a set of availability options is retrieved and used to update the test drive request interface. The test drive request interface can show various time windows of availability that depend on resource availability determined through the resource management stage.

Block S134, which includes retrieving test drive availability options, functions to determine a set of options for a test drive based on the state of the test drive resources. Preferably, there multiple, different availability options are identified but in some cases there may only be one or no options available. Test drive availability options can be based on the requested location for the test drive, any time constraints specified in the request, the availability of the vehicle, and the availability of a representatives to conduct the test drive.

The availability of the vehicle may be dependent on other test drives and the storage location of the vehicle. In the case of a where the test drive can be performed with an interchangeable vehicle (e.g., a new vehicle), availability options may include options based on the availability of one or more interchangeable vehicles. The availability of the set of interchangeable vehicles may be checked. The availability of the vehicle can then be compared against the availability of a worker to act as a representative.

The availability and suitability of various workers can then be accessed to determine if a one can act as a representative. Worker selection can be prioritized based on skill level. Skill level can relate to amount of training, knowledge, sales history, seniority, or other suitable factors. Preferably, the worker is selected at least partially based on the vehicle interests of the customer and/or a skill profile (e.g., a characterization of list of skills, skill level, and/or other attributes). Representatives are preferably selected to show vehicles with which they are more familiar. For example, a representative with experience with sports cars can have a representative profile that promotes selection for higher end cars, while a representative with trucks can have a representative profile that promotes selection for truck and SUV test drives. Representatives may be automatically selected by the resource management system. Alternatively, a set of selected representatives can be notified of the opportunity and at least one will preferably accept the task.

Retrieving test drive availability options can include augmenting availability determination, which may function to use a data-driven approach to offering test drives. Different vehicle types may benefit from different test drive options. The process of retrieving availability options can be different for vehicles in high-demand compared to vehicles with low-demand. The availability may be modified based on browsing patterns of the customer, vehicle demand, historical trends, and/or other factors. In a first variation, the schedule availability may be modified which can include limiting test drive availability options. For example, the availability of a high demand vehicle may appear more restrictive to a customer with a low vehicle interest level. In a second variation, augmenting availability can include augmenting radius of vehicle availability. Vehicles will generally be restricted to particular geographic regions in their test drive availability, because it would be too far to transport a vehicle for a test drive. However, the radius of availability (or other suitable metric for a geographic range of availability) may be dynamically set for a vehicle based on various factors. The radius of availability could be decreased for a vehicle with high demand. For example, for two vehicles, the vehicle with the greater demand can have a smaller radius of availability. The radius of availability could additionally or alternatively be based on the vehicle interest level of a customer. The radius of availability of a vehicle could be increased for customer with high vehicle interest level. For example, for two customers, the customer with the higher vehicle interest level will be able schedule a test drive in a larger radius of availability. In another availability, the availability of workers can be altered so as to prioritize representatives for higher priority test drives. Test drive priority can be based on vehicle demand, the value of the vehicle, the vehicle sales history, and/or other suitable factors. For example, a very experienced representative may have availability biased for high value, difficult to sell vehicles over a low priority test drive of a mid range car with a high amount of supply.

Test drive availability options may additionally be augmented based on demand. Vehicle in high demand could have more restrictive availability options, which may enable the test drives to be conducted at more optimal times for the operators of the marketplace such as not near rush hour.

In some cases, when determining availability, another customer may have already scheduled a test drive for a vehicle. A test drive availability option may include an indicator if an earlier or later test drive is scheduled. In some cases, a deposit could be requested to guarantee a test drive and an option to purchase a vehicle. Absent a deposit, another customer may purchase a vehicle or pay a deposit, which may automatically cancel the test drive.

In one variation, a test drive request may include multiple vehicles. Multiple identified vehicles may indicate possible vehicles for one test drive. Multiple identified vehicles may alternatively indicate that a customer intends to test drive all identified vehicles. Retrieving test drive availability options may include weighting availability options based on relative vehicle interest levels of the identified vehicles. For example, if a user indicates they would like to test drive three vehicles, the shown availability can be biased towards scheduling the test drives in a decreasing interest level order.

Block S136, which includes setting a test drive appointment for a selected test drive availability option, functions to commit the test drive resources for that test drive appointment and scheduling coordination of worker and vehicle transport in block S140. The set of test drive availability options are preferably communicated or synchronized with the test drive scheduling interface. A customer can then preferably select an availability option and confirm a test drive. When setting the test drive appointment, the test drive appointment is preferably scheduled for a representative and a test drive vehicle within the resource management system. A confirmation of the test drive appointment may be sent to the customer, a worker assigned to facilitate the test drive, and/or an owner of the vehicle (if the vehicle is still owned by another party). Additionally, setting a test drive appointment may be accompanied by receiving payment for a test drive fee or deposit. Such fees may be made refundable or made transferable towards the purchase of a vehicle. Once a customer has confirmed a test drive appointment, the customer can receive updates through the website, an application, email, SMS/MMS communications, and/or any suitable communication channel.

In one use-case, the purchase of a vehicle may involve the participation of multiple customers. For example, a husband and wife may both be involved in the purchase decision. The method can coordinate test drive time and location availability between multiple customers. The method can additionally vehicle interests and other information about vehicle feature priority can be stored and used during the test drive experience stage.

Block S140, which includes coordinating representative and vehicle transport to a scheduled location of the test drive, functions to direct test drive resources so that a vehicle is successfully delivered to and optionally returned from a test drive. Block S140 is preferably performed in response to a scheduled test drive but is preferably part of managing test drive resources of block S110. Coordinating representative and vehicle transport may include delivering test drive task assignments. The test drive task assignments can be delivered as an SMS/MMS message, automated phone call, an in-app notification, a notification within a dashboard, or using any suitable communication channel. Test drive task assignments can include various tasks that may be executed to fulfill a test drive. Test drive task assignments may direct tasks for vehicle maintenance, internal resource delivery, vehicle test drive delivery, vehicle test drive return, representative or worker transport, representative preparation, customer support, customer financing support, and/or other suitable tasks. Tasks may be dynamically updated with new information. Task assignments may be sent to a worker when a task is assigned. Updates may be communicated to a worker when a task assignment is added, modified, or canceled. Similarly, reminders may be sent to workers. In one variation, workers and/or vehicles are equipped with location tracking system (e.g., using an application with background location tracking or by adding a physical tracking device). Location can be used to account for resources before, during and after a given test drive. Location services can additionally be used to determine when a task should be started (to account for travel time) and/or to monitor that a task is on schedule.

Vehicle maintenance preferably includes tasks that are completed for a vehicle prior to delivering the vehicle for a test drive. Vehicle maintenance can alert workers at a vehicle storage facility to wash a vehicle, fill the gas-tank or charge the vehicle, perform any mechanical updates, and/or perform any suitable work on the vehicle.

Figure 8A:
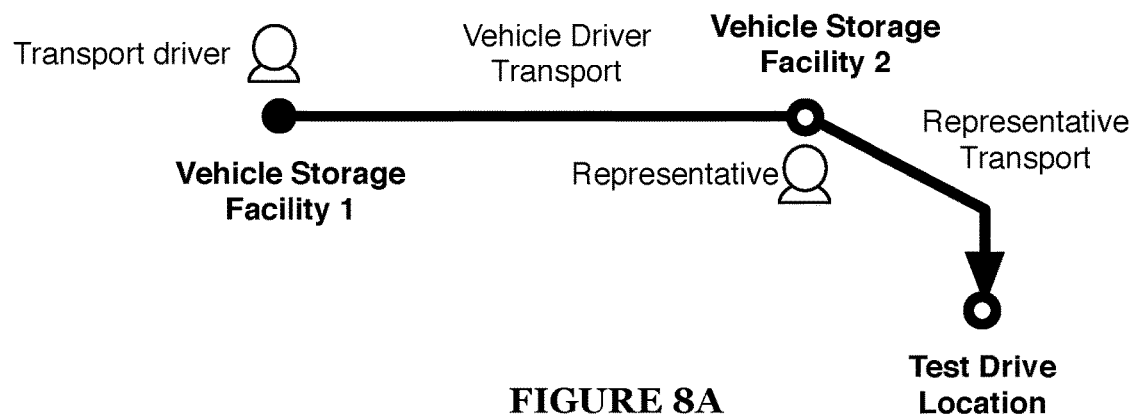
FIGS. 8A and 8B are schematic representations of variations of transporting a vehicle and representative to a test drive appointment.

In some cases, an internal delivery task may utilize internal delivery drivers (i.e., workers providing transport of a vehicle) to move vehicle and/or workers from one location to a second location. Internal delivery task are preferably performed in preparation for a scheduled or predicted test drive as shown in FIG. 8A. Such a preliminary vehicle transport task can function to increase operational efficiency of multiple resource sites. The transported workers could be representatives used in showing a car during a test-drive, other internal delivery drivers and/or any suitable resource needing transport between locations. Workers may be transported using vehicle inventory, but an outside transportation service may be programmatically ordered to facilitate transport of workers between locations. The method preferably models out the availability and location of internal workers. The method can additionally model vehicle capacity, which can be used to move multiple resources between resource sites. For example, multiple representatives can be moved to a particular location central to several upcoming test drives. Internal delivery of vehicles may be scheduled for off-hours to avoid traffic and/or to distribute work of workers.

Figure 8B:
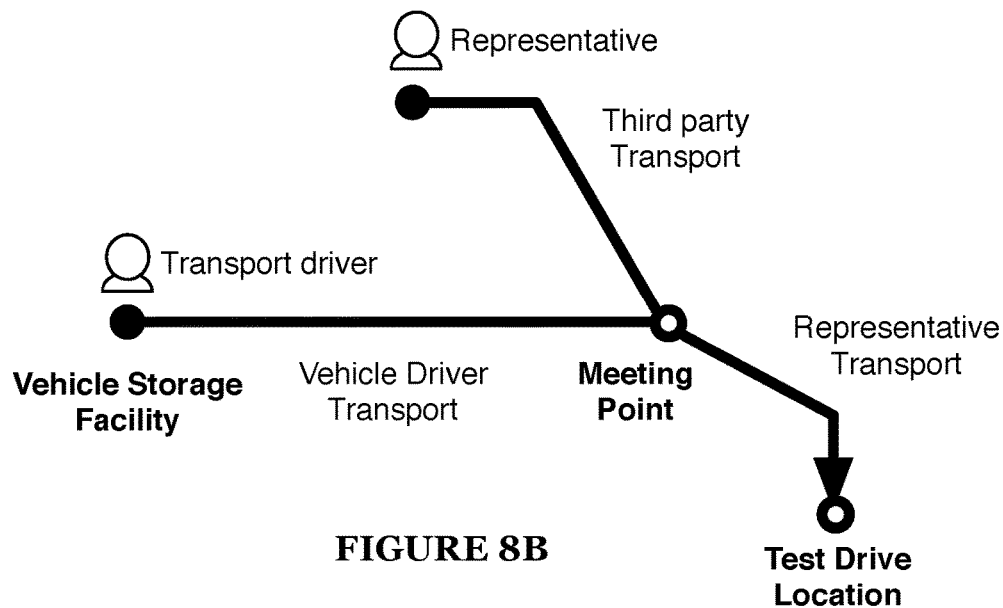

A vehicle test drive delivery task can additionally be used to transport a vehicle to a test drive location. A representative who will facilitate the test drive with the customer may perform the test drive delivery task. Alternatively, a vehicle can be delivered by a vehicle delivery worker to a test drive location or near a test drive location, and the representative arrives through an alternative means of transportation as shown in FIG. 8B. In a second scenario, a customer may be interested in test-driving a second vehicle. The representative could stay on-side with the customer while a delivery task is issued to have the second vehicle delivered. The second vehicle may be delivered to the same test drive location, but the second vehicle may alternatively be delivered to a location along the test drive route, wherein a test drive experience involves driving from one car to another. The internal work responsible for transporting the second car may additionally remove the first vehicle.

The resource management system can additionally plan and coordinate the return of a vehicle after a test drive. A representative will preferably return the vehicle to a specified location, which may or may not be the same location the vehicle was last stored. In the case, where the vehicle is purchased or is not available for use by the representative, transport of the worker can be arranged.

In a test drive preparation task, the resource management system can allocate preparation time for a representative, which functions to give a representative time to familiarize him or herself with the vehicle and/or the customer. The preparation process can include various tasks and/or documentation. Tasks can include inspecting the car, watching a vehicle overview video, reviewing vehicle documentation, reviewing customer financing. Such preparatory information can inform a representative of comparable vehicles, a set of vehicles the customer is considering, customer financing situation, interests of the customer (e.g., package options, engine size, etc.), and/or any suitable information. In one variation, a set of vehicle comparable vehicles are generated based on the vehicle of the test drive, the vehicle interests of the customer, and/or other suitable factors. These comparable vehicles can be used in educating and preparing a representative, but could additionally or alternatively be used when delivering vehicle information during a test drive appointment.

Other tasks such as customer support and/or customer financing support can similarly be assigned. In some cases, such tasks may be conducted by phone. The timing of calls can be coordinated with the timing of the test drive. For example, a financing specialist can be scheduled to be available during the last portion of a test drive so that they could assist in finalizing financing if needed.

Block S140 may additionally include notifying a customer of test drive updates in response to managing test drive resources. A customer can receive notifications alerts for time estimates of a test drive. For example, a user can receive a notification for when a test drive may be delayed or when a representative will be arriving shortly for a test drive.

Block S150, which includes delivering vehicle information during the test drive, functions facilitate a test drive experience by providing assistive notifications and information that can promote an informative and enjoyable test drive. A test drive experience can include various stages such as an in-person walk through when a representative shows the car to a customer, a driving portion of the test drive, and a final discussion stage. During each stage a representative can be tasked with the responsibility of educating a customer, answering questions, demonstrating or highlighting available options and features, as well as addressing the financing and purchasing process. The delivered vehicle information can be used in assisting a representative. In some cases, the delivered vehicle information may be supplied based on the test drive history, skills, and/or experience of the representative. For example, if the representative has never shown a vehicle, then more vehicle information can be supplied to provide more assistance. If the representative has shown the vehicle numerous times then less information may be supplied except, for example, information that may be unique to that vehicle. Additionally, the delivered vehicle information can be specifically selected to target interests of the customer by delivering vehicle information that is selected at least partially based on the browsing patterns and/or vehicle interests of the customer.

Figure 9:
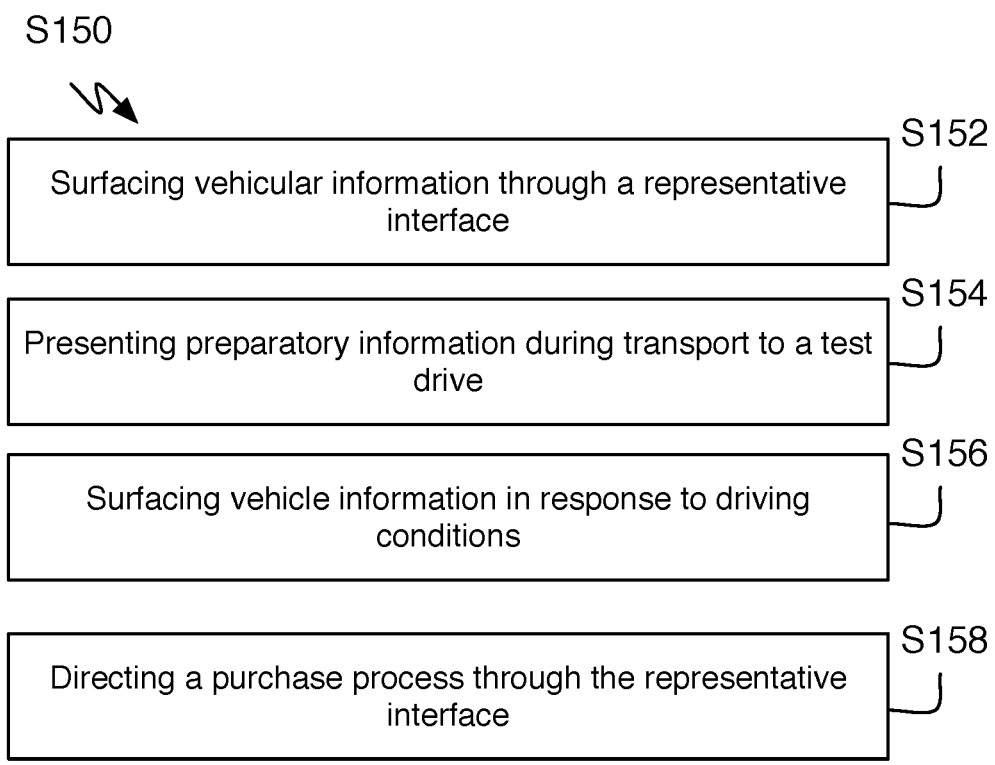
FIG. 9 is a detailed block diagram of delivering vehicle information during the test drive appointment.

Delivering vehicle information during the test drive can include surfacing vehicular information through a representative interface S152. Surfacing can include presenting in a user interface, but may additionally include dynamically presenting in response to detected conditions which may take many forms as shown in FIG. 9. A representative will preferably have at least one computing device with an application or website. The application can include a vehicle information document that can be searched or otherwise navigated to find information about a vehicle. The application may alternatively include a vehicle overview guide, which provides a walk through of the vehicle. A representative can use the overview guide during the in-person stage of the test drive. The overview guide can be generic for the type of car, but can additionally be customized for the particular car or customer. For example, the car history can be built in to the guided tour and various aspects can be prompted based on the stage of the overview guide. For example, if a car had a replaced bumper and an upgraded stereo system, a guided tour may include a prompt about the bumper when the representative is walking the customer around the car and may include a second prompt for when the representative and customer are sitting in the car going over the various features inside the car. Other sorts of information may include comparisons to other vehicles. In one instance, vehicle information may include information customized for the customer based on other vehicles the customer is or may be considering. For example, the monitoring user browsing patterns may include identifying a set of alternative vehicles based on the browsing history and/or vehicle interests, and then delivering information relevant to those alternative vehicles within the representative's application. In another instance, vehicle information may include information customized for the customer based and/or vehicle features of interest to the customer. For example, the gas mileage for the current car and another car considered by the customer can be surfaced to the representative. Additionally, a representative interface can receive user input from the representative, which can augment or update the surfacing of vehicular information. The received user input may be used to supplement a vehicle interest profile of a customer. For example, a representative may enter various information about a customer such as feature preferences, considered vehicles, price range, preferred performance values, preferred vehicle features, and/or any suitable information.

Figure 11:
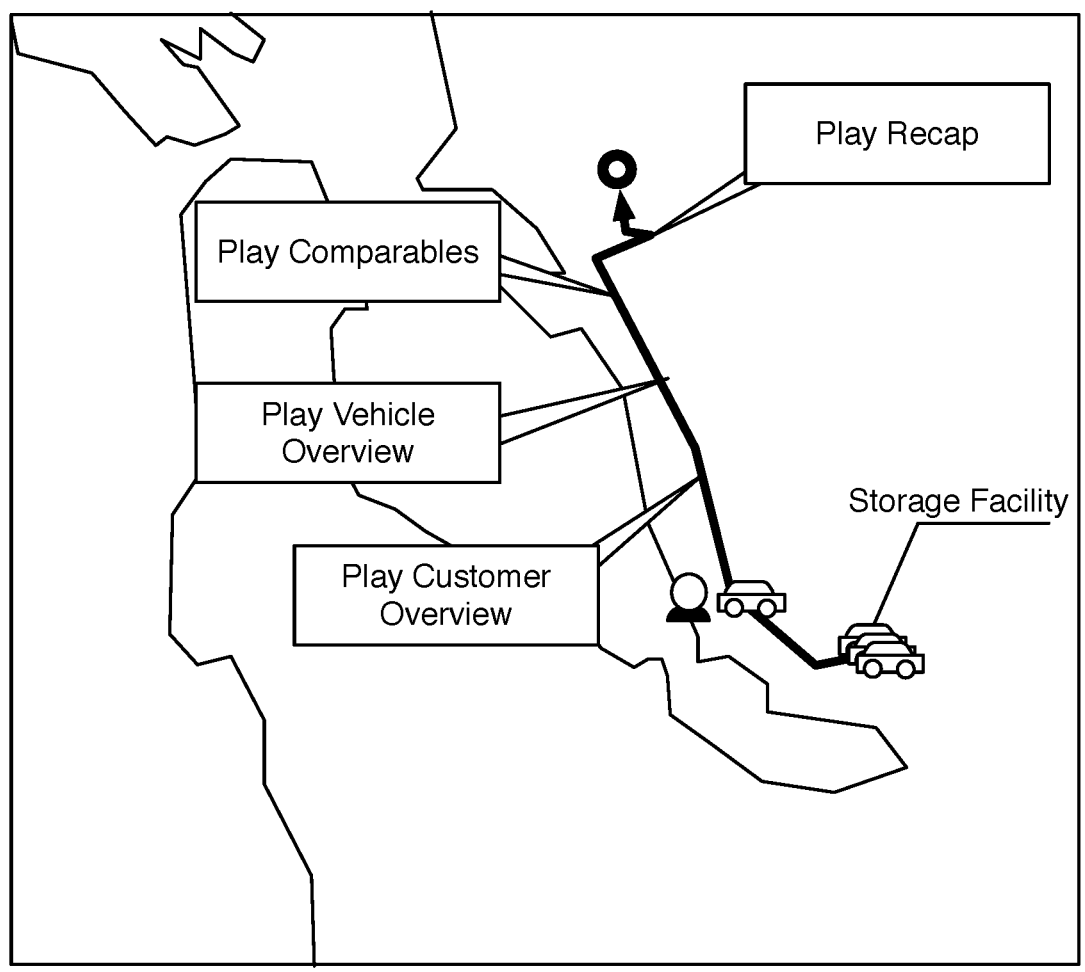
FIG. 11 is a schematic representation of presenting preparatory information to a representative during transport to a test drive appointment.

Surfacing vehicular information through a representative interface can additionally include presenting preparatory information to a representative during transport to a test drive appointment S154. In one variation, automated speech and/or pre-recorded audio can be used to present audio information concerning the upcoming test drive. Video and/or textual information may additionally be available for when the representative is not driving. The amount of information and order can be coordinated and synchronized with the expected arrival time at the test drive location as shown in FIG. 11.

Figure 10:
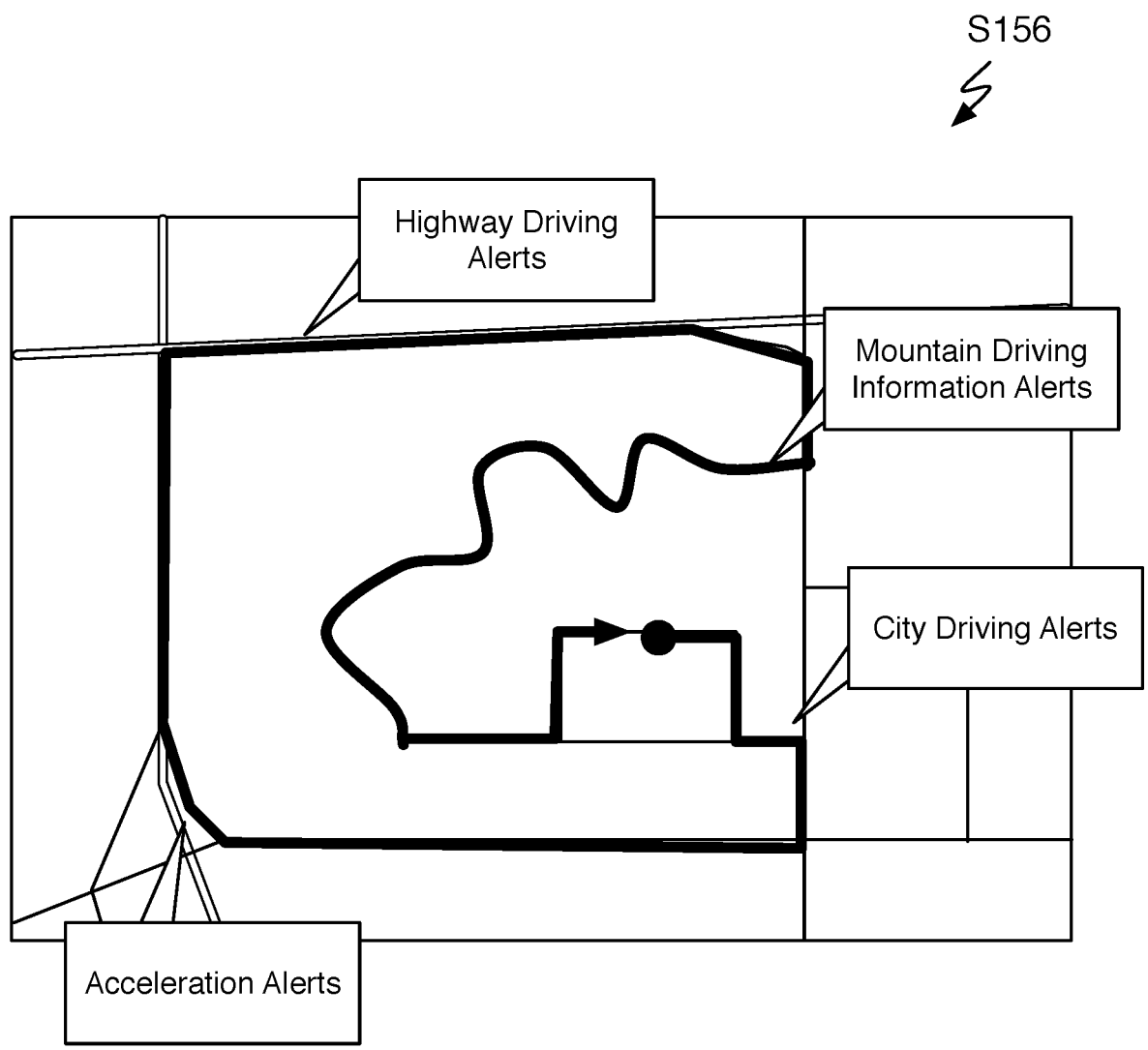
FIG. 10 is a schematic representation of a proposed test drive route and contextual alerts to a representative.

Surfacing vehicle information can additionally include, surfacing vehicular information in response to driving conditions S156, which functions to deliver or present relevant information based on the driving conditions as shown in FIG. 10. This is preferably performed during a driving portion of the test drive but may alternatively be used during the transport stage as a form of representative preparation. Driving conditions can include current driving mode, location, or any suitable condition. Driving modes can include basic driving scenarios such as driving on local streets, opportunities for accelerating (e.g., highway entrances), highway driving, driving on curvy roads, driving up and down hills, and/or any suitable driving scenario. Detecting test drive conditions preferably depends on the sensing technology of the computing device. Location, speed, driving mode, nearby points of interest, and/or other aspects can be detected and used to conditionally alert a representative to relevant information. For example, the acceleration capabilities of a vehicle may be played as the vehicle enters an on ramp to a highway.

Surfacing vehicle information based on the current driving conditions can include generating a driving route and presenting the driving route as shown in FIG. 10. Since the representative may be unfamiliar with the roads where the test drive occurs, a recommended test drive route may be generated and presented for the customer to follow. Generating a driving route preferably identifies a route that will include opportunities for various driving modes. The driving route can be generated based on a preconfigured set of criteria. Alternatively, the driving route may be customized according to a customer profile. For example, if the customer profile indicates the customer is interested in a sports package and optional bike rack, the driving route may identify a hilly road to show handing of the vehicle in conditions potentially of interest to the customer. A driving route can additionally factor in estimated test drive time, which functions to identify a route that does not last too long. The duration can additionally be dynamic based on demand on the representative's time, demand for the particular vehicle, and/or any suitable factor. The application can additionally regenerate an updated recommended route if the vehicle leaves the current route. As mentioned above, information can be surfaced to the representative during the driving portion of the test drive.

Delivering vehicle information during the test drive can additionally include directing a purchase process through the representative interface S158. After being shown the vehicle, a customer can take various actions such as deciding to purchase the vehicle with cash, getting financing to pay for the vehicle, putting a deposit on the car, deciding to try another vehicle, passing on the vehicle, or deciding to make a decision at a later time. The representative interface can generate required documents, collect customer information, and/or facilitate the purchase process in any suitable manner. In some cases, a customer can be given the vehicle and title at the conclusion of the test drive. The operational controller can then arrange transportation of the representative to the next location. If the customer does not want the car, the representative can use the vehicle to go to the next location.

The method includes several variations on managing on-demand test drives, which may be used in various combinations and permutations.

One implementation of a preferred embodiment can be initiated by: receiving an initial test drive request from a user; calculating available windows constrained by the test drive resources of representatives and at least vehicle transport time; presenting the available test drive time windows to a user; confirming a test drive request; and notifying a representative with information about the test drive. The representative will drive the vehicle to the location of the test drive, give an overview of the vehicle to the user, guide the user during the driving portion of the test drive, and possibly providing contextually relevant information during the overview and driving portion. After, being shown the vehicle, the representative can walk the user through the purchase process if the customer would like to buy, rent, or lease the car. This test drive process is preferably repeated across multiple distributed resources of a vehicle marketplace.

In one implementation focused on delivering relevant information, the browsing patterns of a customer can be monitored and used to drive delivery of vehicle information during a test drive.

In an implementation focused on automating on-demand test drives, can utilize the management of test drive resources, scheduling of test drives through an online marketplace and coordination of representatives and vehicle transport to test drive locations.

An implementation focused on driving sales, may monitor browsing patterns of a customer on a vehicle marketplace and using extracted vehicle interest information and test drive resource constraints to determine how to prioritize scheduling of a test drive and selection of a representative for a test drive.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   at a resource management system operable in connection with an online vehicle marketplace, tracking location and availability information of a set of workers and a set of vehicles equipped with a location tracking system;
   at the online vehicle marketplace, monitoring user browsing patterns of customers and determining a vehicle interest level of a set of vehicles for a customer;
   at a test drive request interface of a native application or a web-based application of the online vehicle marketplace, receiving a test drive request from the customer, the request specifying a requested vehicle and test drive location;
   at the online vehicle marketplace, retrieving test drive availability options from the resource management system for the requested vehicle, wherein the retrieved test drive availability options are based on the test drive location, the availability of the requested vehicle as determined by the resource management system through the equipped the location tracking system, and the availability of a worker to conduct the test drive as determined by the resource management system; [SEP]
   at the online vehicle marketplace, augmenting the test drive availability options based in part on a vehicle interest level of the customer for the requested vehicle and historical trends of test drive demand for the requested vehicle;
   updating the test drive request interface with test drive availability options;
   at the test drive request interface, selecting by a customer a selected test drive availability option;

at the resource management system, receiving the selected test drive availability option and setting a test drive appointment for the selected test drive availability option; and at the resource management system, coordinating worker and vehicle transport to a scheduled location of the test drive appointment comprising determining when at least one test drive task should be started based on location information from the location tracking system of the requested vehicle to account for travel time and communicating the test drive task assignment to a user interface of a worker device through a network.

2. The method of claim 1, wherein monitoring the user browsing patterns comprises characterizing browsing patterns of the customer.

3. The method of claim 1, wherein monitoring the user browsing patterns comprises characterizing browsing patterns of multiple users of the vehicle marketplace.

4. The method of claim 1, wherein the vehicle interest level increases directly related to the amount of interaction with the requested vehicle on the vehicle marketplace.

5. The method of claim 1, wherein the vehicle interest level decreases with the quantity of vehicle features of the requested vehicle that differ from other vehicles inspected by the customer on the online vehicle marketplace.

6. The method of claim 1, wherein augmenting availability of the requested vehicle comprises augmenting the availability geographic range of a vehicle according to the vehicle interest level of the requested vehicle.

7. The method of claim 1, wherein augmenting availability of the requested vehicle comprises artificially limiting schedule availability of the requested vehicle.

8. The method of claim 1, wherein coordinating worker and vehicle transport further comprises delivering test drive task assignments to a set of workers, wherein the set of workers includes at least one worker that is delivered a test drive task assignment for acting as the representative during the test drive appointment.

9. The method of claim 8, wherein coordinating worker and vehicle transport comprises selecting at least one worker as a representative at least partially based on the skill profile of the worker.

10. The method of claim 8, wherein the set of workers includes a second worker that is delivered a test drive task assignment for vehicle transport from a first vehicle storage facility to a second vehicle storage facility.

11. The method of claim 1, wherein managing a set of vehicle and worker resources comprises identifying a region for a new vehicle storage facility based on a history of test drive appointments.

12. The method of claim 1, wherein managing a set of vehicle and worker resources comprises automatically augmenting worker supply.

13. The method of claim 12, wherein automatically augmenting worker supply comprises managing a current supply of workers through schedule and incentive adjustments.

14. The method of claim 12, wherein automatically augmenting worker supply comprises initiating automated recruitment tasks.

15. The method of claim 1, further comprising delivering vehicle information during the test drive appointment, wherein the vehicle information is selected at least partially based on user browsing patterns.

16. The method of claim 1, wherein augmenting the test drive availability options comprises augmenting the retrieved test drive availability options at least partially based on the test drive history of the customer.

* * * * *